US007409693B2

United States Patent
McCain et al.

(10) Patent No.: US 7,409,693 B2
(45) Date of Patent: Aug. 5, 2008

(54) METHOD AND SYSTEM FOR PROVIDING VERSION CONTROL OF PARAMETERS IN A COMMAND-BASED API USING JAVA SERIALIZATION

(75) Inventors: Brian S. McCain, Tucson, AZ (US); Amy L. Therrien, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/697,761

(22) Filed: Oct. 30, 2003

(65) Prior Publication Data

US 2005/0097575 A1 May 5, 2005

(51) Int. Cl.
*G06F 9/44* (2006.01)
(52) U.S. Cl. ...................... 719/328; 719/316
(58) Field of Classification Search ......... 719/310–313, 719/315–316, 328, 330; 709/201–203, 217–219
See application file for complete search history.

(56) References Cited

U.S. PATENT DOCUMENTS

| | | | | |
|---|---|---|---|---|
| 5,682,536 A * | 10/1997 | Atkinson et al. | ............ | 717/165 |
| 5,944,781 A * | 8/1999 | Murray | ....................... | 709/202 |
| 6,003,050 A | 12/1999 | Silver et al. | | |
| 6,066,181 A | 5/2000 | DeMaster | | |
| 6,260,077 B1 * | 7/2001 | Rangarajan et al. | ......... | 719/328 |
| 6,266,666 B1 * | 7/2001 | Ireland et al. | .................. | 707/10 |
| 6,356,946 B1 * | 3/2002 | Clegg et al. | ................. | 709/231 |
| 6,438,559 B1 | 8/2002 | White et al. | | |
| 6,470,494 B1 | 10/2002 | Chan et al. | | |
| 6,519,594 B1 | 2/2003 | Li | | |
| 6,754,704 B1 | 6/2004 | Prorock | | |
| 6,848,108 B1 * | 1/2005 | Caron | ........................ | 719/315 |
| 6,850,979 B1 * | 2/2005 | Saulpaugh et al. | .......... | 709/225 |
| 6,868,447 B1 * | 3/2005 | Slaughter et al. | ............ | 709/225 |
| 6,970,869 B1 * | 11/2005 | Slaughter et al. | .............. | 707/10 |
| 7,117,504 B2 * | 10/2006 | Smith et al. | .................. | 719/328 |
| 2003/0055862 A1 * | 3/2003 | Bhat | .......................... | 709/101 |
| 2003/0191803 A1 * | 10/2003 | Chinnici et al. | ............. | 709/203 |
| 2003/0204645 A1 * | 10/2003 | Sharma et al. | .............. | 709/328 |

OTHER PUBLICATIONS

Opyrchal et al. "Efficient Object Serilization in Java", 1999 IEEE, pp. 96-101.*

(Continued)

*Primary Examiner*—Van H. Nguyen
(74) *Attorney, Agent, or Firm*—Scully, Scott, Murphy & Presser

(57) ABSTRACT

A technique for determining whether a server host supports the functions in a command sent by a client host. The client host formulates a command including a command object that contains parameter objects. The parameter objects, which represent the functions, are serialized, e.g., using the Java serialization command, and communicated to the server host. The server host attempts to deserialize the parameter objects. If it is successful, it is concluded that the server host supports the functions represented by the parameter objects. Or, it is concluded that the server host is incompatible with the functions represented by one or more parameter objects that cannot be deserialized. The server host may be a storage server, and the functions may be storage-related, such as a copy type to be performed.

5 Claims, 2 Drawing Sheets

OTHER PUBLICATIONS

Grosso "Java RMI" Oct. 2001. Chapter 10: Serialization.*
Park et al. "Specializing The java Object Serialization Using Partial Evaluation For A faster RMI", 2001 IEEE, pp. 451-458.*
The Java™ Tutorial, Aug. 25, 2003, 2pp.
Lecture notes from MSc Programming in Java, Univ. of Edinburgh, Aug. 25, 2003, 5pp.

* cited by examiner

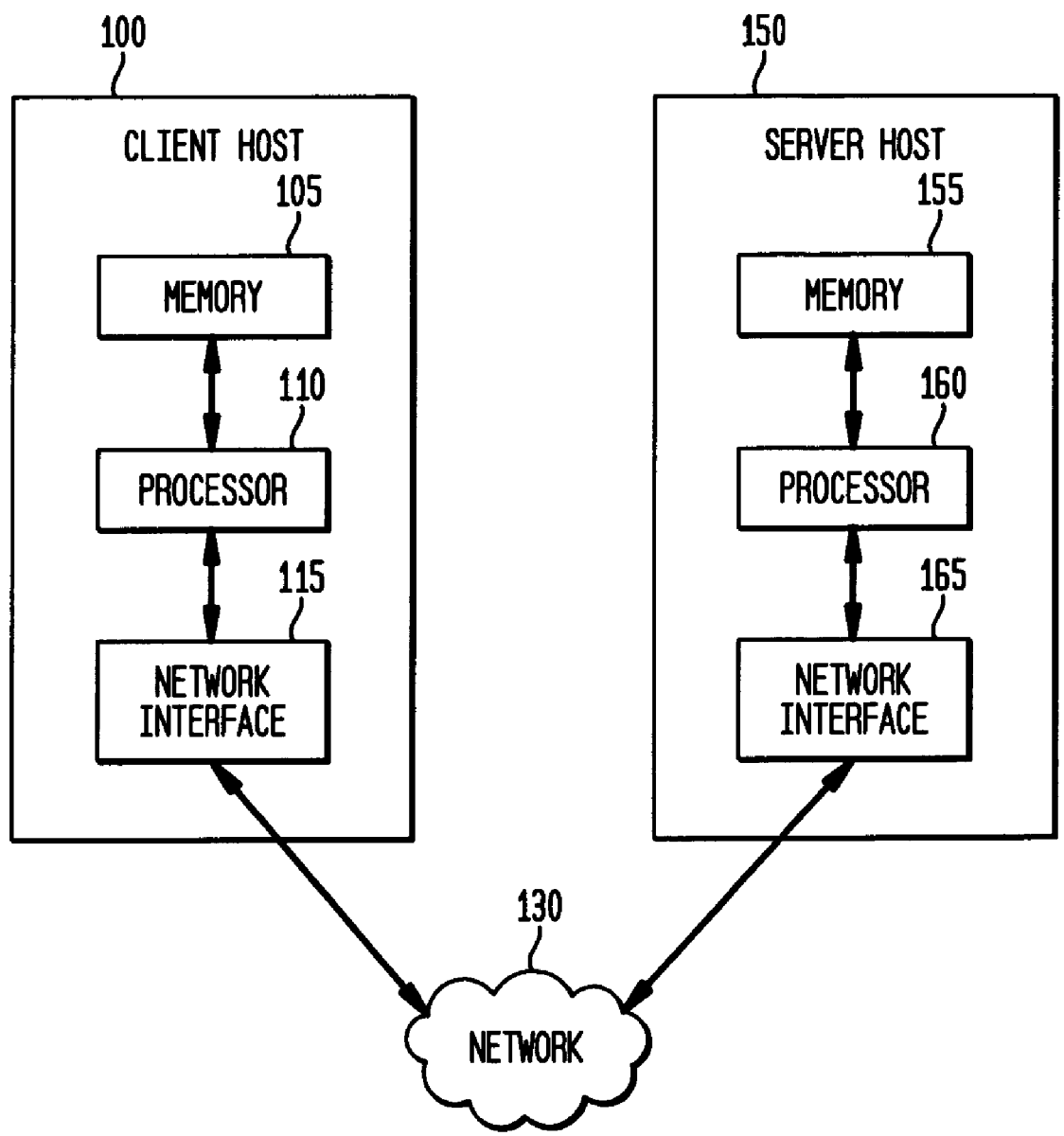

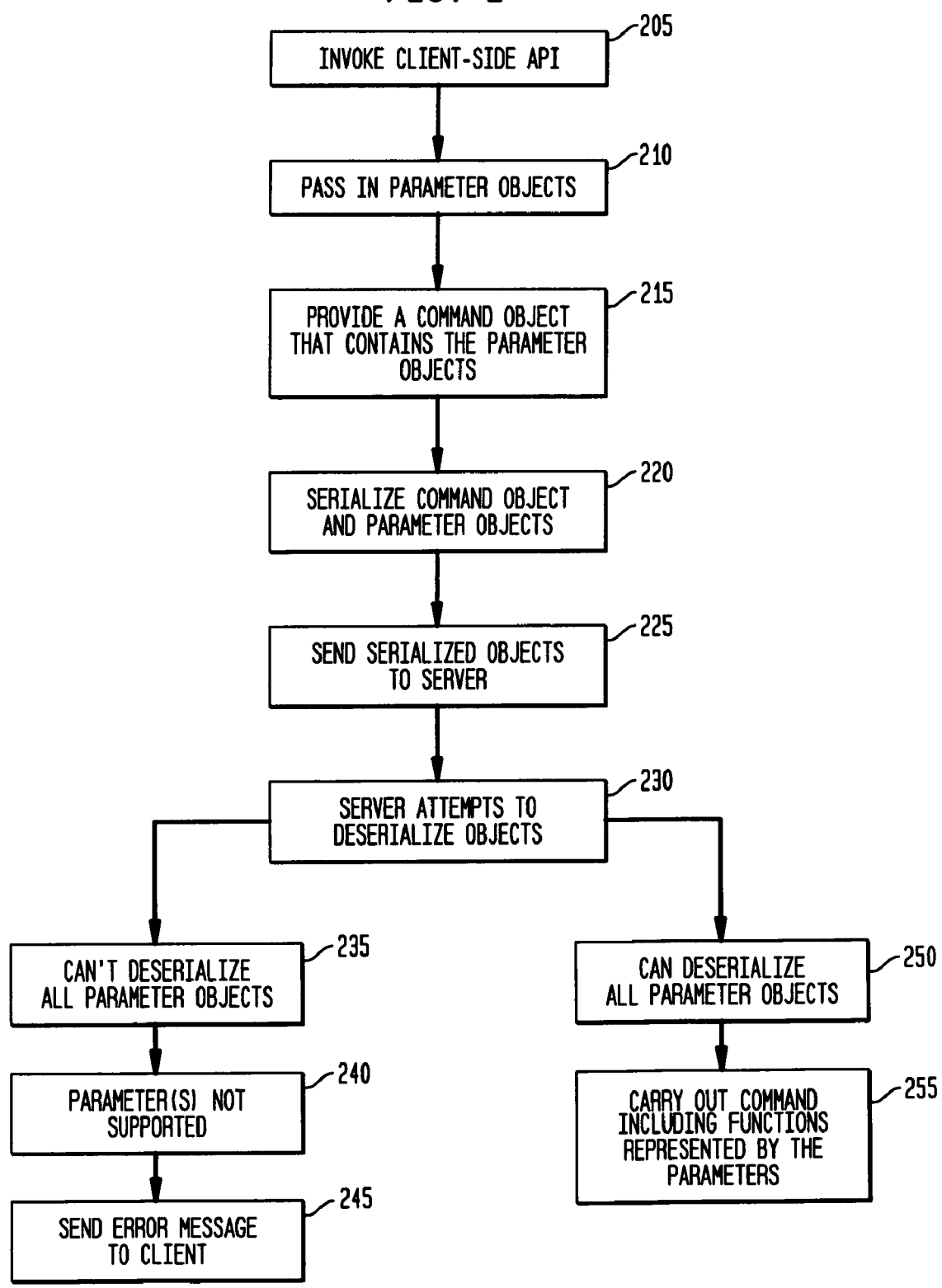

METHOD AND SYSTEM FOR PROVIDING VERSION CONTROL OF PARAMETERS IN A COMMAND-BASED API USING JAVA SERIALIZATION

BACKGROUND OF THE INVENTION

1. Field of the Invention

The invention relates generally to the field of computer systems and, more specifically, to a technique for determining whether a server-side host supports a command provided by a client-side host.

2. Description of the Related Art

Computer systems include host computers that communicate with one another via a network to run network applications. Typically, software is distributed and run on two or more hosts to realize the application. The network applications have application-layer protocols that define the format and order of the messages that are exchanged between the hosts, and what actions to take when a message is transmitted or received. In particular, a network application typically includes a client side and a server side. In this case, the application may be referred to as a client/server application. A client side on one host may communicate with a server side on another host. The client is usually the host that initiates a communication or session with another host.

However, difficulties arise when the client host and server host are running different versions of the network application or other software. In this case, the client may provide a command to the server requesting it to perform a specific function that the server does not support. Various approaches have been developed to address this problem. For example, the client may send additional data to the server such as a codeword that identifies the version the client is using. However, this approach lacks generality and requires that a special protocol for coding and decoding the version data be implemented.

BRIEF SUMMARY OF THE INVENTION

To overcome these and other deficiencies in the prior art, the present invention provides a technique for determining whether a server supports different functions that are represented by parameter objects in a command that is sent to a server-side host by a client-side host.

In a particular aspect of the invention, a method for providing a command from a client-side host to a server-side host is provided. The method includes invoking a client-side application programming interface (API) at the client-side host to pass in a set of parameter objects, and to provide a command object that contains the parameter objects; wherein each of the parameter objects represents a different parameter of a command; serializing the command and parameter objects to provide serialized command and parameter objects; and communicating the serialized command and parameter objects to the server-side host as the command.

In another aspect of the invention, a method for processing a command from a client-side host at a server-side host is provided. The method includes receiving serialized command and parameter objects at the server-side host as a command from the client-side host; wherein the command object contains the parameter objects, and each of the parameter objects represents a different parameter of the command; and deserializing the serialized command and parameter objects to determine whether the server-side host is compatible with the different parameters represented by the parameter objects.

A related program storage device is also provided.

BRIEF DESCRIPTION OF THE DRAWINGS

These and other features, benefits and advantages of the present invention will become apparent by reference to the following text and figures, with like reference numbers referring to like structures across the views, wherein:

FIG. 1 illustrates a client-side host and a server-side host in a computer system; and FIG. 2 illustrates a method for providing version control.

DETAILED DESCRIPTION OF THE INVENTION

Generally, the present invention provides a technique for providing version control of parameters in a command-based, client-server network application programming interface (API). In a client-server network API, the levels of functionality supported by the client and server may differ. Moreover, in a command-based API, new functionality may be represented as new additional parameters to the commands. For example, for a server host in a storage subsystem, the functions may be storage-related. The functions may specify, e.g., a copy type to be performed, a location to store data, or other storage action to be taken. For instance, in the IBM® Enterprise Storage Server (ESS) storage subsystem, one function may be a normal, continuous flash copy (an instant copy of data, such as a point-in-time copy of a volume), while another function may be an incremental flash copy. The functions may also be thought of as optional features that may or may not be supported by different server hosts. The programming challenge is how to determine if a specific parameter of a command from the client portion of the API is supported by, e.g., compatible with, the server portion of the API. The present invention addresses this challenge by using Java deserialization of class type to determine if the server supports a specific parameter and the function represented by the parameter.

FIG. 1 illustrates a client-side host 100 and a server-side host 150 in a computer system. The client host 100 includes a processor 110, memory 105 and network interface 115, while the server host 150 similarly includes a processor 160, memory 155 and network interface 165. The network interfaces 115 and 165 communicate with one another via a network 130 such as the Internet. The client-side host 100 may implement a client-side API that comprises a client-side of a command-based API, while the server-side host 150 may implement a server-side API that comprises a server-side of the command-based API. In a command-based API, one or more hosts send commands to one or more other hosts. For example, a command-based API may be used by a storage subsystem host and remote hosts that send data to the storage subsystem host to be backed up. The remote hosts may issue commands to the storage subsystem host to instruct it to backup their data, or to retrieve previously backed up data, for instance.

The general operation and configuration of the processors 110, 160, memories 105, 155 and network interfaces 115, 165 is well known in the art and is therefore not described in detail. The components illustrated are provided to assist in understanding the invention. The hosts 100, 150 may be general-purpose computers, workstations, servers, portable devices such as PDAs, or other computer devices. The functionality described herein can be achieved by configuring the hosts 100 and 150 with appropriate software. In one approach, the software comprises an object-oriented software such as Java code that is stored in the memories 105, 155. In this case, the memories 105, 155 are program storage devices. The software is executed using the processors 110, 160 in a known manner.

FIG. 2 illustrates a method for providing version control. At block 205, the client-side API method is invoked at the client host 100, passing in a set of parameter objects (block 210). At block 215, a command object is provided that contains the parameter objects. At block 220, the command object and parameter objects are serialized by the client host's code, such as Java code. At block 225, the serialized objects are sent from the client host 100 to the server host 150 over the network 130. The server host 150 receives the serialized parameters and, at block 230, attempts to deserialize them. The serialized command object is also received and deserialized. If the server host 150 can't successfully deserialized all of the parameter objects (block 235), e.g., the Class type of one or more of the parameters is not known by the server host 150, it is concluded that the server host 150 does not support the one or more parameters that cannot be successfully deserialized (block 240). In this case, the server host 150 may send an error message to the client host 100 informing it that the one or more parameters are not supported. The client host 100 may then decide, e.g., to reformulate its command so that the one or more unsupported parameters are not included, or to locate another server host that may be compatible with the one or more parameters in question. If the server host 150 can successfully deserialize all of the parameter objects (block 250), it carries out the command, including the functions represented by the parameters (block 255).

Specifically, in accordance with the invention, each new parameter for a command based API is defined as a unique new Java Class type. Each parameter Class may or may not contain data. Java Serialization is used to transmit parameters from a Java Client, e.g., client host 100, to a Java Server, e.g., server host 150. Whenever a new parameter (class) is added to the client host 100, and the parameter is sent to the server host 150, the server host 150 will either deserialize the parameter successfully if the server supports the functionality represented by the parameter, or fail to successfully deserialize it, indicating that the server does not support the parameter/functionality. A particular advantage of this technique for providing version control is that only one definition for a parameter is required. The version control information and the functionality are contained within one object, so no additional, separate version control data is needed. The Class type itself is the only unique data necessary to determine whether the API at the server host 150 supports a given functionality. Thus, an important aspect of the invention is how the classes for commands and parameters are organized. Example declarations of classes are provided further below.

Serialization is the process of converting an object to a byte stream. Deserialization is the opposite process. When an object is serialized, information about its class and other objects that it refers to is also saved. To serialize an object using Java, an object is passed as an argument to the writeObject( ) method of an object of class java.io.ObjectOutputSteam which, in turn, is built from an object of class java.io.FileOutputStream. Moreover, an object is serializable when its class implements the Serializable interface. This is an empty interface that doesn't contain any method declarations, but simply identifies classes whose objects are serializable. During deserialization, the readObject( ) method is invoked on an object of class java.io.ObjectInputStream, which is built upon a java.io.FileInputStream object. If the server host 150 cannot locate a class file needed to make sense of a parameter object during deserialization, the exception java.lang.ClassNotFoundException is thrown.

Example code for performing serialization is as follows:

```
Class Command1 implements Serializable{
    Parameter[ ] parms;
    Public Command1(Parameter[ ] parms);
};
Class Parameter implements Serializable { };
Class ParameterA { } extends Parameter {
    Public static ParameterA Option = new ParameterA( );
};
Class ParameterB { } extends Parameter{
    Public static ParameterB Option = new ParameterB( );
}
// Example code to create command and serialize:
Parameter[ ] parms = {ParameterA.Option, ParameterB.Option}
Command1 commandInstance = new Command1(parms);
outputStream.writeObject(commandInstance);
```

Example code for performing deserialization is as follows:

```
Try {
Command1 command = (Command1) inputStream.readObject( );
} catch (ClassNotFound Exception) {
// This means the command is not supported
handleNotSupported( );
}
```

Generally, the command serialization and parameter serialization are recursive. The process can be outlined as follows:
1) A Command contains Parameters.
2) Code invokes Command.writeObject( ).
3) Command.writeObject method knows that in order to serialize a Command object, it must serialize everything contained within that object.
4) So, then Command.writeObject( ) invokes Parameter.writeObject( ).
5) Parameter.writeObject( ) knows that in order to serialize a Parameter object, it must serialize everything contained within the Parameter.
6) All parameter data is serialized at this point. Parameter serialization is done.
7) Control turns back to Command.writeObject( ). All Parameters have been serialized. Any other data in Command is serialized and Command Serialization completed.
8) Command.writeObject completes.

Moreover, the process may be analogized to nested Russian dolls. For instance, say we had three nested Russian dolls—big, medium and small. The top call would be to BigDoll.writeObject( ), which under the covers would invoke, MediumDoll.writeObject( ), which under the covers would invoke LittleDoll.writeObject( ). Deserialization is similar (outside->in).

While the above examples are provided using Java™, which is a high-level object-oriented programming language developed by Sun Microsystems, Inc., the invention is suitable for use with other object-oriented programming languages as well.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for providing a command from a client-side host to a server-side host, comprising:

invoking a client-side application programming interface (API) at the client-side host to pass in a set of parameter objects, and to provide a command object that contains the parameter objects;

wherein each of the parameter objects represents a different parameter of a command, said different parameter representing a different function and each new parameter for the command is defined as a unique new class type;

serializing the command and parameter objects to provide serialized command and parameter objects; and sending the serialized command and parameter objects to the server-side host as the command to determine whether said server-side host supports said different function, receiving the serialized command and parameter objects at the server-side host as the command from the client-side host;

deserializing, by said server-side host, the serialized command and parameter objects to determine whether the server-side host is compatible with the different parameters of the command that are represented by the parameter objects, the server-side host determining that the server-side host is not compatible with one or more of the different parameters if the server-side host does not support a class type associated with said one or more of the different parameters, and reformulating, by said client-side host, the command to delete one or more parameters determined to be incompatible, wherein:

if the server-side host cannot successfully deserialize at least one of the serialized parameter objects, the server-side host sends an error message to the client-side host to inform the client-side host that the server-side host does not support the parameter represented by the at least one serialized parameter object that cannot be successfully deserialized.

2. The method of claim 1, wherein: the server-side host cannot successfully deserialize the serialized parameter objects whose class type is not recognized by the server-side host.

3. The method of claim 1, wherein: the client-side API comprises a client-side of a command-based API.

4. The method of claim 3, wherein: the server-side host uses a server-side API of the command based API to attempt to deserialize the serialized command object and all parameter objects.

5. The method of claim 1, further including:

receiving the error message from the server-side host that said function is not supported; locating a second server-side host that supports said function; and communicating the serialized command and the parameter objects to the second server-side host.

* * * * *